United States Patent [19]

Tiesler

[11] Patent Number: 4,771,575
[45] Date of Patent: Sep. 20, 1988

[54] VEHICLE FLUSH GLASS DOOR ASSEMBLY HAVING A BI-PIVOT LIVING HINGE GUIDE MEANS

[75] Inventor: Roy F. Tiesler, Troy, Mich.
[73] Assignee: General Motors Corporation, Detroit, Mich.
[21] Appl. No.: 87,873
[22] Filed: Aug. 21, 1987
[51] Int. Cl.[4] .............................................. E05F 11/52
[52] U.S. Cl. ........................................ 49/211; 49/375; 49/377
[58] Field of Search ................. 49/211, 215, 216, 221, 49/225, 227, 348, 349, 350, 351, 352, 374, 375, 376, 377

[56] References Cited

U.S. PATENT DOCUMENTS

| 1,905,429 | 4/1933 | Ball | 49/227 |
| 3,888,044 | 6/1975 | Lystad | 49/227 |
| 4,420,906 | 12/1983 | Pickles | 49/352 |
| 4,575,967 | 3/1986 | Bickerstaff | 49/211 |

FOREIGN PATENT DOCUMENTS 101956  10/1922  Switzerland ................. 49/211

Primary Examiner—Kenneth J. Dorner
Assistant Examiner—Gerald A. Anderson
Attorney, Agent, or Firm—William A. Schuetz

[57] ABSTRACT

A window guide arrangement for a framed vehicle door assembly includes pairs of stationary side-by-side guide tracks carried by the door thereof and a bi-pivoted guide means having integral living hinges slidably contained in the tracks and connected with the window, the guide arrangement being operable to guide the movement of the window and to position the window when in its closed position so as to be substantially flush with the exterior of the door assembly at its belt line and the bi-pivoted guide means including an integral noise abatement baffle and an interior close out seal.

6 Claims, 2 Drawing Sheets

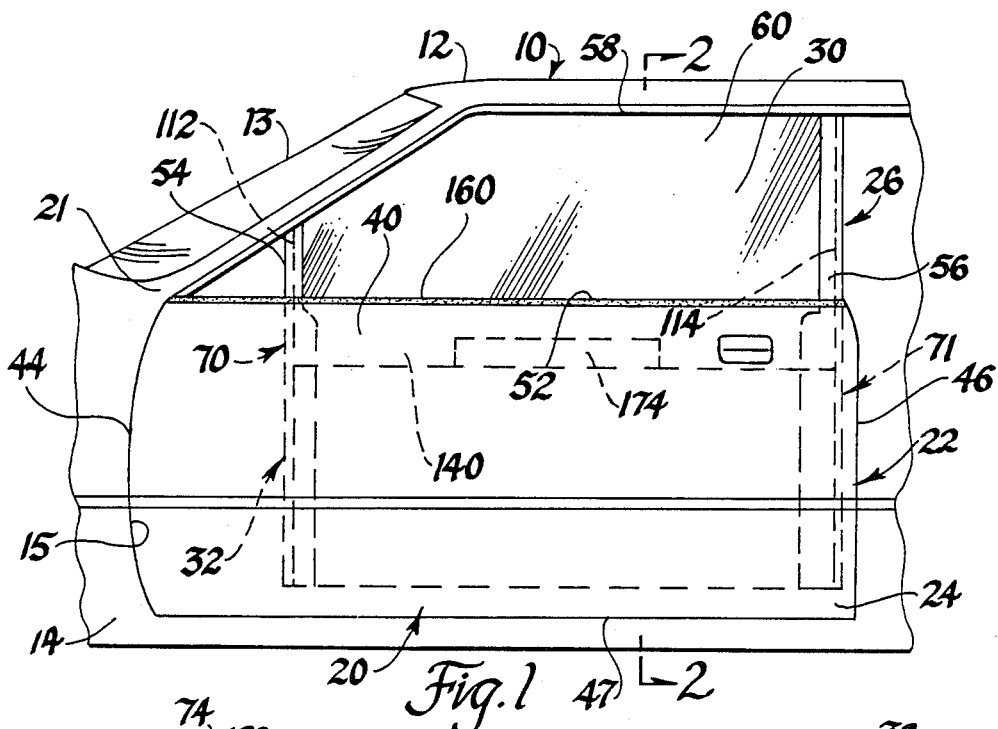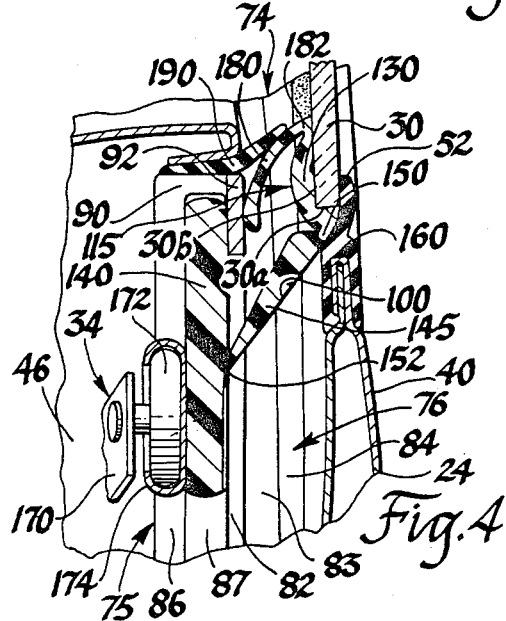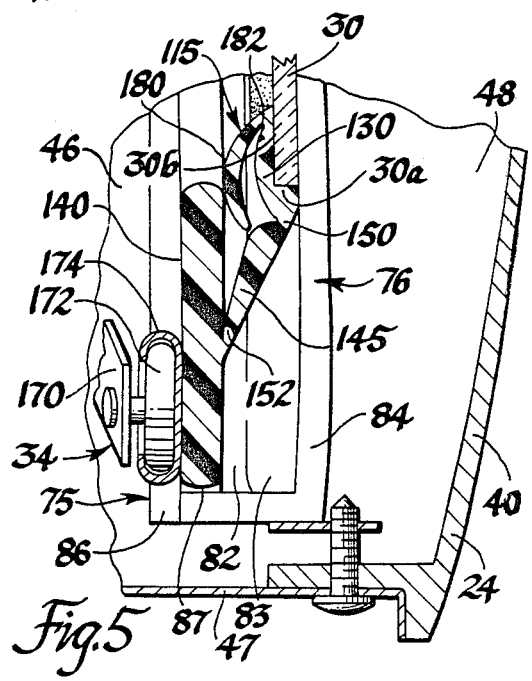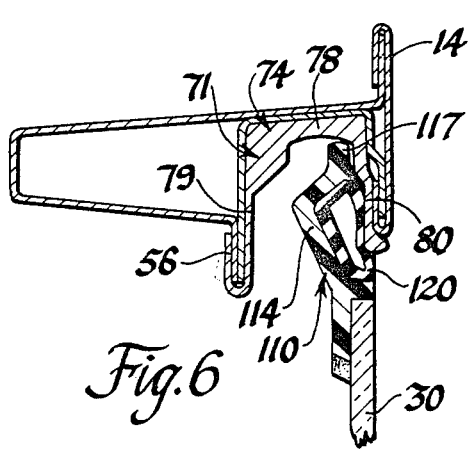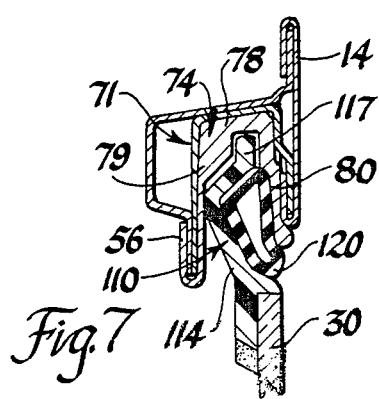

VEHICLE FLUSH GLASS DOOR ASSEMBLY HAVING A BI-PIVOT LIVING HINGE GUIDE MEANS

The present invention relates to a door assembly for an automotive vehicle and, more particularly, to a framed door assembly having a vertically movable window and a window guide arrangement including a pair of guide tracks carried by the door means and a bi-pivoted guide means having living hinges slidably received in the guide tracks and which is operable to effect movement of the window outwardly so that it will be substantially flush with the door means at its exterior belt line when the window is in its closed position.

Heretofore, vehicle door assemblies have been provided which included window guide arrangements for effecting movement of the window outwardly of the door at the belt line so as to be substantially flush therewith when in its closed position. Examples of such arrangements are disclosed in U.S. Pat. Nos. 2,979,327 and 4,575,967 and German Pat. No. 24 35 766. These arrangements, however, have included fairly complicated guides and/or rollers to control the path of movement of the window so that the lower edge would be substantially flush with the belt line.

The present invention is directed to the concept of providing a window guide arrangement for use in a framed vehicle door assembly which is an improvement over the known prior art arrangements in that it not only enables the window to be substantially flush with the exterior door assembly at its belt line thereof when in its closed position, but which is also of a simplified construction having a minimal number of parts, does not require close manufacturing tolerances and allows a seal means of constant shape to be employed.

Accordingly, a broad object of the present invention is to provide a new and improved window guide arrangement for a framed door assembly for use in an automotive vehicle and which is operable to position the window when in its closed position so as to be substantially flush with the exterior body structure of the door assembly at its belt line and which is of a simplified construction, has a minimal number of parts, does not require close manufacturing tolerances and allows a seal means of constant shape to be employed.

Another object of the present invention is to provide a new and improved window guide arrangement for a framed door assembly for use in an automotive vehicle and which includes a bi-pivoted guide means having integral living hinges slidably contained in a track assembly for movement along a constant radius and which is operable to position the window when in its closed position so as to be substantially flush with the exterior body structure of the door assembly and in which the bi-pivoted guide means also includes a noise abatement baffle and, preferably, an interior close out seal at the belt line when the window is in its closed position.

Yet another object of the present invention is to provide a new and improved door assembly, as defined in the next preceding object, and in which the track assembly includes inner and outer side by side guide tracks carried by the door assembly adjacent its fore and aft ends and with the outer track having an outer wall whose upper end terminates adjacent the belt line of the door assembly and defines a cam, and in which the bi-pivoted guide means includes a first guide portion secured to the window adjacent its bottom edge and whose opposite sides are slidably received within the outer guide tracks, a second portion slidably received in the inner guide tracks and an intermediate baffle portion which is integrally hinged at one end to the first portion via a first pivotal living hinge and integrally hinged at its other end to the second portion via a second pivotal living hinge, and wherein the first and second living hinges are pivoted in opposition to their self-biasing forces when the first and second guide portions thereof are slidably received within the outer and inner guide tracks and with the self-biasing forces of the first and second living hinges causing the first guide portion and the window at its lower end to be moved outwardly of the door means so as to be substantially flush therewith when the first guide portion clears the cam as the window approaches its fully raised position and with the first and second living hinges being pivoted in opposition to their self-biasing forces as the cam moves the first guide portion and the lower end of the window inwardly and into the outer guide track as the window is being lowered from its fully closed position.

A still further object of the present invention is to provide a new and improved window guide arrangement for a frame door assembly, as defined in the next preceding object, and wherein the intermediate baffle portion connecting the first and second guide portions function as a noise abatement baffle, and wherein the guide means also includes a close out seal member integrally hinged via a third living hinge to the first portion of the guide means at a location above the baffle and which functions as a close out seal when the window is in its raised position to close off the opening of the door means at the belt line thereof.

The present invention further resides in various novel constructions and arrangement of parts, and further objects, novel characteristics and advantages of the present invention will be apparent to those skilled in the art to which it relates and from the following detailed description of the illustrated, preferred embodiments thereof made with reference to the accompanying drawings forming a part of this specification and in which similar reference numerals are employed to designate corresponding parts throughout the several views, and in which:

FIG. 1 is a fragmentary side elevational view of an automotive vehicle embodying the novel framed door assembly of the present invention;

FIG. 4 is an enlarged fragmentary sectional view of part of the door assembly shown in FIG. 2 and labeled by the phantom line circle 4 in FIG. 2;

FIG. 5 is an enlarged fragmentary sectional view of part of the door assembly shown in FIG. 3 and labeled by the phantom line circle 5 in FIG. 3;

FIG. 6 is a fragmentary sectional view taken along the lines 6—6 of FIG. 2; and

FIG. 7 is a fragmentary sectional view taken along the lines 7—7 of FIG. 2.

Figure 2:
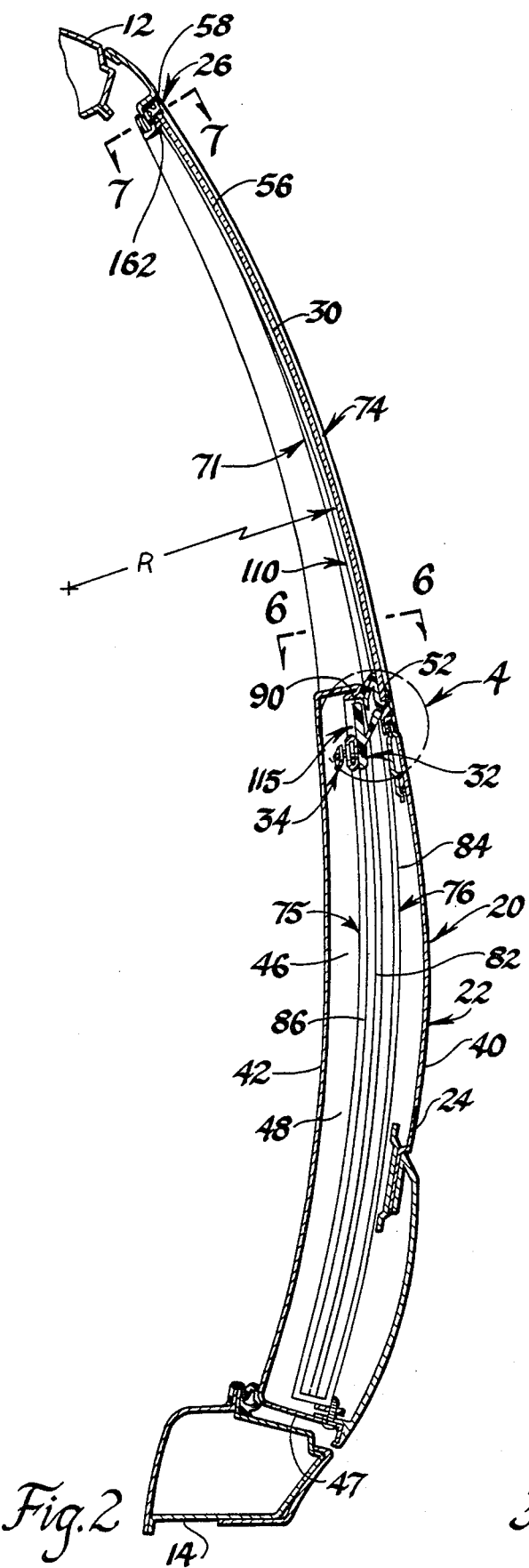
FIG. 2 is an enlarged cross sectional view of the vehicle shown in FIG. 1 and looking in the direction of the arrows 2—2 of FIG. 1.

Referring to FIG. 1 of the drawings, an automotive vehicle 10 is thereshown. The vehicle 10 includes a roof 12, a front windshield 13 and side body structure 14 defining a door opening 15. The vehicle 10 further includes a novel door assembly 20 embodying the present invention which is adapted to be suitably hinged adjacent via hinges (not shown) to the front or A pillar 21 of the vehicle 10 and which can be moved between an open and a closed position in which it opens and closes off the opening 15 to permit ingress and egress to the interior of the vehicle 10.

As best shown in FIGS. 1 and 2, the novel door assembly 20 comprises, in general, a vehicle door means 22 having a lower body 24 and an upper frame 26 or frame means, a curved window 30 movable between open and closed positions and a window guide arrangement 32 for guiding the path of movement of the window 30 between open and closed positions and which is operable to position the window 30, when in its closed position, so that it is substantially flush with the exterior lower body 24 of the door means 22 and so that it is substantially flush with the frame means 26 at its exterior side. In addition, the door assembly 20 includes a suitable or conventional window regulator mechanism 34 (only parts of which are shown) operatively connected with the window 30 to effect movement of the same between its open and closed positions.

Figure 3:
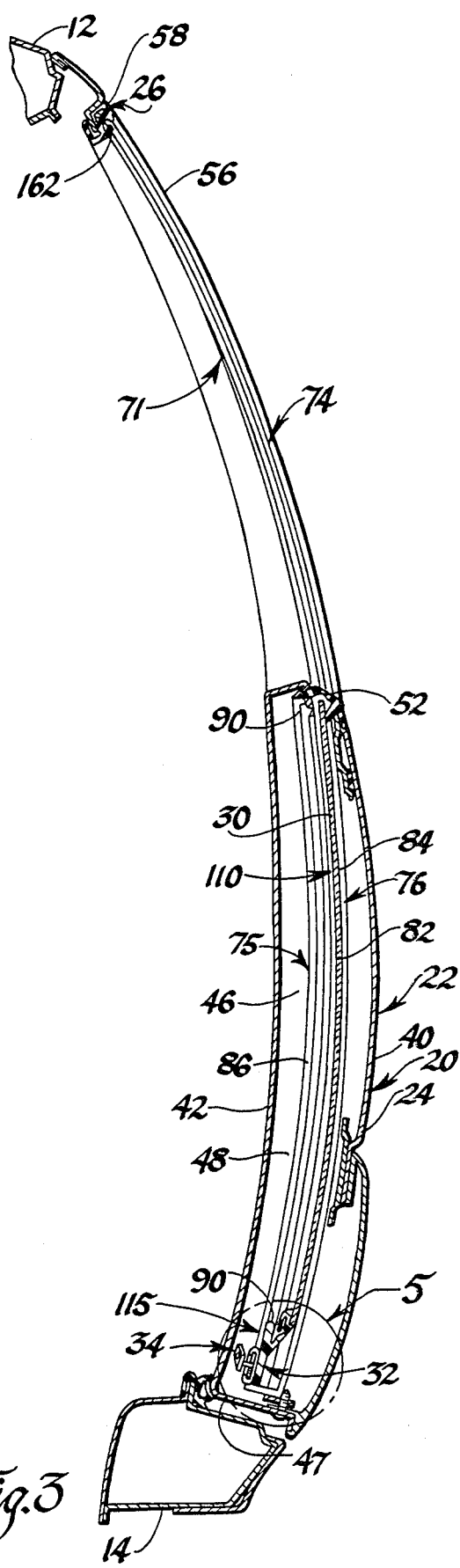
FIG. 3 is a view like that shown in FIG. 2, but showing different parts thereof in different positions.

As best shown in FIGS. 2 and 3, the lower body 24 of the door means 22 comprises an outer panel 40, an inner panel 42, a pair of end panels or walls 44 and 46 at the fore and aft ends of the door assembly, respectively, and a bottom 47 which are suitably secured or welded together and which together define a well 48 having an elongated opening 50 at its top or upper end 52. The upper end 52 defines the belt line location of the door assembly 20 or vehicle 10.

The door means 22 also includes the frame means 26 which is of a generally inverted U-shape, as viewed in elevation, and which is U-shaped, as viewed in cross-section. The frame means 26 includes upwardly extending front and rear sides or side portions 54 and 56 and a top or top portion 58. The frame means 26 and the door ends, bottom and inner and outer panels 44, 46, 47, 40 and 42 respectively, are preferably made from sheet metal. The sides 54, 56 and top 58 of the frame means 26 define a window opening 60 above the belt line 52 of the door assembly 20.

The window 30 is made from a suitable transparent material, such as glass, and in curved as viewed in cross section in FIG. 2. Its radius of curvature is designated by the reference numeral R.

The window guide arrangements 32 slidably guides the window 30 for movement between a closed position, as shown in FIGS. 1 and 2, in which it closes off the opening 60, and an open position, as shown in FIG. 3, in which it is wholly disposed within the wall 48 of the lower door body 24. To this end, the window guide arrangement 32 comprises a pair of stationary guide track assemblies 70 and 71 at the fore or front and rear or aft ends of the window 30, respectively. The guide track assemblies 70 and 71, except for their length, are of an identical construction and therefore only the guide track assembly 71 at the rearmost portion of the window 30 will be described in detail, and the same reference numerals will be used to designate corresponding parts in the guide track assembly 70.

The guide track assembly 71 comprises an upper guide track track means 74 carried by the side 56 of the frame means 26 and a pair of lower guide tracks 75 and 76 carried by the aft end 46 of the door means 22. The upper guide track 74 is generally U-shaped in cross section and is suitably secured within the U-shape side frame portion 56 of the frame means 26. The U-shaped upper guide track 74 throughout its length has a bottom 78 (as best shown in FIGS. 6 and 7), an inner side wall 79 and an outer side wall 80 which defines an elongated recess or opening facing toward the adjacent rear side edge of the window 30. The upper guide track 74 has a width between its outer and inner side walls 80 and 79 which progressively increases proceeding from the top edge of the guide track adjacent the roof 12 of the vehicle 10 toward the belt line 52, and for reasons to be hereinafter more fully described.

The guide tracks 75 and 76 in the lower door body 24 of the door means 22 are disposed side by side, as best shown in FIGS. 2–5, and are suitably secured to the end wall 46 of the lower door body 24. The guide tracks 75 and 76 are preferably molded from a suitable plastic material as one piece and each has a radius of curvature which is equal to the radius of curvature R of the window 30. The guide tracks 75 and 76 are each U-shaped, as viewed in cross section, and have a common wall 82. The outermost guide track 76, i.e., the guide track located closest to the outer door panel 40, has an outer wall 84, a spaced inner wall 82 defined by the intermediate wall 82 and a bottom wall 83. The innermost guide track 75, i.e., the guide track located closest to the inner door panel 42, has an outer wall defined by the intermediate wall 82, a spaced inner wall 86 and a bottom wall 87. The inner guide track 75 extends from adjacent the bottom 47 of the door body 24 to a location closely adjacent the belt line 52. The guide track 75 at its upper end is closed to define a stop 90 and its outer wall 82 at the top includes a downwardly extending flange 92 extending laterally across the door body 24 between the fore and aft tracks 75. The lower guide track 76 extends from adjacent the bottom 47b of the door body 24 to a location adjacent the belt line 52 of the door means 22. The outer wall 84 of the track 76 terminates at a location below the belt line 52 of the door means 22 and defines a tapered or beveled cam 100 at its upper end, as best shown in FIG. 4. The outer lower guide track 76 forms a continuation of the upper guide track 74 and the two tracks could either be formed integral with each other or as separate plastic guide tracks which are aligned with each other.

The window guide arrangement further includes a window guide means 110 slidably contained or received within the guide track assemblies 70, 71 for guiding the movement of the window 30 between its upper and lower positions. The guide means 110 comprises a pair of side guide or guide means 112 and 114 extending along the front edge and rear edge of the window 30 and a bottom guide or guide means 115 extending along the bottom edge of the window 30.

The side guides 112 and 114 comprise a pair of modules suitably bonded to the window along its side edges and inner side portions adjacent the side edges and except for their length are of an identical construction and only the side guide 114 will be described in detail. As best shown in FIGS. 6 and 7, the side guide 114 has a laterally outwardly projecting side portion 117 from the side edge of the window 30 which is generally V-shaped and whose overall shape is generally complementary with the inner surface of the guide track 74. This laterally projecting portion 117 carries a suitable elastomeric hollow seal means 120 adhesively bonded thereto and which engages the outer wall 80 of the guide track 74.

The side guide and seal means 114 and 120 do not, per se, form a part of the present invention, and is more fully disclosed and claimed as a separate invention in Applicant's co-pending patent application assigned to the same assignee as the present invention, and filed concurrently herewith and designated by Ser. No. 87,468 filed 8-20-88. Suffice it to say for present purposes that the tapered guide track 74, as can be seen by the varying width thereof in FIGS. 6 and 7, allows the window 30 to be moved or pivoted about its upper end toward and from its plane of movement a limited extent and that this movement enables the window as it approaches its fully up position to be moved outwardly to cause the seal 120 to be moved into tight engagement with the outer side wall 80 of the guide track 74 and allows the window 30 as it is initially being lowered to be moved out of tight engagement with the side wall 80 of the track 74 so as to minimize friction during opening and closing movements.

The bottom guide means 115 serves multi-functions or purposes and is molded as a single piece from a suitable elastomeric or plastic material. The lower guide 115 comprises a first guide portion 130 which is suitably bonded to the window 30 along its lower edge 30a and along its inner side 30b adjacent the lower edge 30a. The first guide portion 130 extends the entire width of the window 30 as it is preferably bonded or adhesively secured together with the side guides 112 and 114 at its opposite ends. The first guide portion 130 at its opposite ends is adapted to be slidably received in the lower outer guide tracks 76 of the guide track assemblies 70, 71.

The bottom guide means 115 further includes a second guide portion 140. The second guide portion 140 is elongated and has its opposite ends slidably received within the lower inner guide tracks 75. It has a width which is slightly less than the width between the bottom 87 of the guide tracks 75 and is rigid or substantially rigid so as to enable it to extend laterally across the spaced guide track assemblies 70 and 71. The bottom guide means 115 further includes an intermediate baffle portion 145 whose upper end, as viewed in FIGS. 4 and 5, is integrally hinged with the first guide portion 130 via an integral pivotal living hinge 150 and whose lower end is pivotally connected to the second guide portion 140 via a pivotal living hinge 152. The baffle 145 has a thickness, as viewed in cross section which is non-uniform and has a length which is slightly less than the length of the upper guide portion 130 and the lower second guide portion 140, but is integrally hinged about its length with these guide portions 130 and 140.

The living hinges 150 and 152 are self biased toward a normal free state position in which the first and second guide portions 130 and 140 would be spaced apart a distance as measured by planes passing through their farthest apart vertical surfaces which is greater than the distance defined by the width between the walls 86 and 84 of the combined guide tracks 75 and 76, respectively. The living hinges 150 and 152 are pivotable in opposition to their self biasing forces so as to enable the first and second guide portions 130 and 140 to move toward each other and be received within the guide tracks 75 and 76.

The operation of the window guide arrangement 32 will now be described. When the window 30 is in its fully open position, in which it is wholly disposed within the well 48 of the lower door body 24, the various parts have the position as shown in FIGS. 3 and 5.

In this position, the first guide portion 130 is slidably received within the outer guide tracks 76 and is in its lowermost position within the guide track 76, as best shown in FIG. 5. Likewise the second guide portion 140, which is slidably received in the inner guide tracks 75, is also in its lowermost position, as best shown in FIG. 5. In this position, the living hinges 150 and 152 have been pivotally moved or flexed in opposition to their self-biasing forces with the result that they biasingly hold the first and second guide portions 130 and 140 respectively in engagement with the outer wall 84 of the guide tracks 76 and the innermost wall 86 of the guide tracks 75.

When it is desired to raise the window from its fully open position, as shown in FIGS. 3 and 5, to its fully closed position, as shown in FIGS. 2 and 4, the window is moved upwardly. Since the radius of curvature of the upper guide track 74, lower guide tracks 75 and 76 and the window 30 are the same, the window 30 will be raised along the guide tracks and with the side guides 112, 114 sliding along the upper track 74 and the first and second portions 130 and 140 of the guide means 115 sliding up the guide tracks 76 and 75, respectively. During this upward movement, the window 30 also remains adjacent the inner wall 79 of the upper guide track 74 whereby the seal means 120 is not in tight engagement with the outer side wall 80 of the guide track 74 so as to minimize friction therebetween.

As the window 30 approaches its upper position, the first guide portion 130 moves upwardly past the cam or cam surface 100 on the outer wall 84 of the guide track 76. When this occurs, the self-biasing forces of the living hinges 150 and 152 will cause the lower first portion 130 of the guide means 115 and the baffle portion 145 and hence, the lower end of the window 30 to be moved outwardly toward the outer panel 40 of the lower door body 24. This movement is allowed because the first guide portion 130 and the baffle 145 ride over and clear the cam 100 and the window side guides 112, 114 can shift in the tapered guide track 74. Thus, the window 30 pivots outwardly about its upper end from its position adjacent the inner wall 79 of the guide track 74 toward the outer wall 80 thereof and causes the seal means 120 to be deflected and moved into tight sealing engagement with the outer wall 80 of the guide track 74. When the window has reached its uppermost position, the second guide portion 140 will engage the upper stop 90 and further outward movement of the window 30 will be prevented due to the engagement between the baffle 145 and the cam 100 on the outer wall 84 of the guide track 76.

This outward shifting movement of the window 30 as it approaches its closed position, also causes the lower end thereof to be moved into engagement with a combined seal and molding 160 carried by the outer door panel 40 at the belt line 52 thereof so that the window 30 will be positioned to be substantially flush with the exterior surface of the outer panel 40 at the belt line 52. In addition, the outward movement of the window 30 will cause the sides of the windows to be moved toward the outer wall 80 of the guide track 74 so as to position the sides of the window to be substantially flush with the sides 54 and 56 of the frame means 26. In addition, the upper edge of the window can be arranged and positioned with respect to the top side 58 of the frame means 26 so as to be substantially flush therewith, as best shown in FIG. 2, and, preferably, engages a seal 162 carried by the top side 58 of the frame means 26.

When it is desired to lower the window from its fully closed position towards its open position, the reverse movement as above described will take place. That is, the cam 100 as the window is being lowered, will cause the baffle means 145 to be deflected inwardly which in turn causes the first guide portion 130 and the lower end of the window 30 to be moved inwardly about the living hinges 150 and 152 and in opposition to their self-biasing forces. When these have been moved inwardly, the lower first guide portion 130 and the lower end of the window will be disposed within the guide track 76 and further downward movement will merely cause the window 30 to ride down the guide track 76 until it reaches its fully open position, as shown in FIGS. 3 and 5. In addition, as the window 30 is caused to be moved inwardly upon being opened, it also moves toward the inner side wall 79 of the guide track 74 which relieves the tight engagement between the seal means 120 and the outer wall 80 of the guide track 74 so as to minimize friction between the seal means 120 and the guide track 74.

The window 30 is adapted to be moved between its open and closed position by the window regulator mechanism 34. The window regulator mechanism 34 could be of any suitable or conventional construction, but preferably would include a sector arm 170 which is pivotally connected to a roller 172, the roller in turn being rollably or slidably received within a horizontally disposed sash plate 174 secured to the second or slider portion 140 of the bottom guide means 115. Rotation of the sector arm 170 in opposite directions will cause the roller 172 to move horizontally within the sash plate 174 to cause the window 30 to be moved up and down.

It should be noted that the baffle portion 145, in addition to connecting the first and second guide portions 130 and 140 together also serves as a noise abatement baffle to prevent road or other noises from being transmitted through the door means 22 upwardly via the well 48 and into the interior occupant compartment of the vehicle. This insures a quieter ride in the vehicle.

Moreover, it should be noted that the bottom guide means 115 also includes a belt line close out and seal 180. The seal 180 comprises a deflectable, fairly thin member, which is integrally hinged via a third living hinge 182 to the upper end of the guide portion 130, as best shown in FIGS. 4 and 5. The living hinge 182 biases the close out seal 180 toward a position in which it engages the upper end of the second guide portion or slider 140. As the window 30 is moved from its open position towards its closed position and approaches its closed position, the close out seal 180 will engage the downwardly extending portion 92 on the intermediate wall 82 of the guide tracks 75 and 76 and be caused to be further deflected in opposition to its self-biasing forces. Also, when the window 30 is in its fully raised position, the close out seal 180 engages a suitable seal 190 secured to the underside of the upper end portion of the inner panel 42 of the door body 24. This provides a close out seal to prevent dust and other materials from entering the well 80 of the door means when the window is in its raised position.

From the foregoing, it should be apparent that a novel window guide arrangement has been provided for guiding a window between its open and closed positions and which is of a relatively simple and economical construction, having a minimal number of parts, which does not required close tolerance limitations and which positions the window when in its fully closed position so as to be substantially flush on all sides with the adjacent exterior door structure. In addition, the provision of the one piece bottom guide which has a bi-pivoted hinge means provides for a very simple guide means which is not sensitive to tolerance variations, and in addition, provides a noise abatement function.

Although the illustrated embodiment hereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. A door assembly for an automotive vehicle comprising
    a door means having a lower body and an upper frame, said lower body including inner and outer spaced panels and fore and aft ends which together define a door well having an elongated opening at its belt line,
    said frame having upwardly extending fore and aft sides and a top which together with the belt line of the lower body defines a window opening,
    a window supported by said door means for generally vertical movement between open and closed positions and a window guide arrangement including a pair of guide track means carried by the door means adjacent its fore and aft ends and guide means carried by the window and slidably received within said guide tracks and with the guide arrangement being operable to effect movement of the window through a path such that the window at its lower end is substantially flush with the outer panel of the lower door body,
    the improvement being that said guide track means includes inner and outer side-by-side guide tracks carried by said door means adjacent its fore and aft ends and with the outer track having an outer wall whose upper end terminates adjacent said belt line and defines a cam, and that said guide means includes a first guide portion secured to said window adjacent its bottom edge and whose opposite side ends are slidably receivable within said outer guide tracks, a second guide portion slidably received with said inner guide tracks and an intermediate baffle portion which is integrally hinged at one end to said first portion via a first pivotal living hinge and integrally hinged at its other end to said second portion via a second pivotal living hinge,
    said first and second pivotal living hinges being self-biased toward a free state position in which said first and second guide portions are spaced apart a distance greater than the combined width of said guide tracks,
    said first and second living hinges being pivoted in opposition to their self biasing forces when said first and second guide portions are slidably received within said outer and inner guide tracks,
    the self biasing forces of said first and second living hinges causing said first guide portion and said window at its lower end to be moved outwardly of the door means so as to be substantially flush with the outer panel thereof when the first guide portion clears said cam as the window approaches its fully raised position and said first and second living hinges being pivoted in opposition to their self-biasing forces as the cam moves the first guide portion and lower end of the window inwardly and into said outer guide tracks as the window is being lowered from its fully closed position, said intermediate baffle portion connecting said first and second guide portions also functioning as a noise abatement baffle.

2. A door assembly for an automotive vehicle comprising a door means having a lower body and an upper frame, said lower body including inner and outer spaced panels and fore and aft ends which together define a door well having an elongated opening at its belt line, said frame having upwardly extending fore and aft sides and a top which together with the belt line of the lower body defines a window opening, a window supported by said door means for generally vertical movement between open and closed positions and a window guide arrangement including a pair of guide track means carried by the door means adjacent its fore and aft ends and guide means carried by the window and slidably received within said guide tracks and with the guide arrangement being operable to effect movement of the window through a path such that the window at its lower end is substantially flush with the outer panel of the lower door body, the improvement being that said guide track means includes inner and outer side-by-side guide tracks carried by said door means at its fore and aft ends and with the inner track terminating at its upper end in a stop and the outer track having an outer wall whose upper end terminates adjacent said belt line and defines a cam, and that said guide means includes a first guide portion secured to said window adjacent its bottom edge and whose opposite ends are slidably receivable within said outer guide tracks, a second guide portion slidably received within said inner guide tracks and an intermediate baffle portion which is integrally hinged at one end to said first portion via a first pivotal living hinge and integrally hinged at its other end to said second portion via a second pivotal living hinge, said first and second pivotal living hinges being self-biased toward a free state position in which said first and second guide portions are spaced apart a distance greater than the combined width of said guide tracks, said first and second living hinges being pivoted in opposition to their self biasing forces when said first and second guide portions are slidably received within said outer and inner guide tracks, the self biasing forces of said first and second living hinges causing said baffle portion and said first guide portion and window at its lower end to be moved outwardly over said cam toward the outer door panel to an outer position so that the window is substantially flush with the outer panel of said door means when the first guide portion clears said cam as the window approaches its fully raised position, said second guide portion engaging said stop on said inner guide tracks and said baffle portion engaging said cams on said outer guide tracks when the window is fully raised to limit the extent of the outward movement of said window to said outer position and with the self-biasing forces of said first and second living hinges biasingly holding the window in its outer position, said first and second living hinges being pivoted in opposition to their self-biasing forces as the cam moves the baffle portion and first guide portion and lower end of the window inwardly and into said outer guide tracks as the window is being lowered from its fully closed position, said intermediate baffle portion connecting said first and second guide portions also functioning as a noise abatement baffle, and a close out seal integrally hinged via a third living hinge to said first guide portion at a location above said baffle portion, said close out seal being self-biased toward engagement with said second guide portion and being deflectable and engaging a downwardly extending flange located at the upper end of said inner guide track when the window is in its raised position to close off and seal the opening in said door means.

3. A door assembly for an automotive vehicle comprising a door means having a lower body and an upper frame, said lower body including inner and outer spaced panels and fore and aft ends which together define a door well having an elongated opening at its belt line, said frame having upwardly extending fore and aft sides and a top which together with the belt line of the lower body defines a window opening, a window supported by said door means for generally vertical movement between open and closed positions and a window guide arrangement including a pair of guide track means carried by the door means adjacent its fore and aft ends and guide means carried by the window and slidably received within said guide tracks and with the guide arrangement being operable to effect movement of the window through a path such that the window is substantially flush with the outer panel of the lower door body and the outer surfaces of said upper frame, the improvement being that said guide track means includes inner and outer side-by-side guide tracks carried by the lower body of said door means at its fore and aft ends and with the inner track terminating at its upper end in a stop and the outer track having an outer wall whose upper end terminates adjacent said belt line and defines a cam, and upper tracks carried by the sides of said upper frame and with the upper tracks being aligned with said outer tracks and having a width which progressively increases proceeding from the top of said upper frame toward said lower body, and that said guide means includes side guides secured to the window at its sides and which are slidably received in said upper guide tracks and a first bottom guide portion secured to said window adjacent its bottom edge and whose opposite ends are slidably receivable within said outer guide tracks, a second guide portion slidably received with said inner guide tracks and an intermediate baffle portion which is integrally hinged at one end to said first portion via a first pivotal living hinge and integrally hinged at its other end to said second portion via a second pivotal living hinge, said first and second pivotal living hinges being self-biased toward a free state position in which said first and second guide portions are spaced apart a distance greater than the combined width of said guide tracks, said first and second living hinges being pivoted in opposition to their self biasing forces when said first and second guide portions are slidably received within said outer and inner guide tracks, the self biasing forces of said first and second living hinges causing said baffle portion and said first guide portion and window to be moved outwardly over said cam toward the outer door panel to an outer position so that the window is substantially flush with the outer panel of said door means at its belt line and with the exterior side of said upper frame when the first guide portion clears said cam as the window approaches its fully raised position, said second guide portion engaging said stop on said inner guide tracks and said baffle portion engaging said cams or said outer guide tracks when the window is fully raised to limit the extent of the outward movement of said window to said outer position and with the self-biasing forces of said first and second living hinges biasingly holding the window in its outer position, said first and second living hinges being pivoted in opposition to their self-biasing forces as the cam moves the baffle portion and first guide portion and the window inwardly and into said outer guide tracks as the window is being lowered from its fully closed position, said intermediate baffle portion connecting said first and second guide portions also functioning as a noise abatement baffle, and a close out seal integrally hinged via a third living hinge to said first guide portion at a location above said baffle portion, said close out seal being self-biased toward engagement with said second guide portion and being deflectable and engaging a downwardly extending flange located at the upper end of said inner guide track when the window is in its raised position to close off and seal the opening in said door means.

4. A door assembly, as defined in claim 2, and wherein said intermediate baffle portion has a non-uniform thickness as viewed in cross section.

5. A door assembly, as defined in claim 4, and wherein said guide means is made from an elastomeric material.

6. A door assembly, as defined in claim 3, and wherein said side guides carry seal means of a uniform cross-sectional shape for engaging said upper tracks along their outer side wall and wherein the seal means is moved into tight engagement with said outer wall of said upper guide tracks when the window approaches its closed position and is moved out of tight engagement therewith during its downward and upward movement.

* * * * *